(12) United States Patent
Mitsui et al.

(10) Patent No.: US 9,139,890 B2
(45) Date of Patent: Sep. 22, 2015

(54) LIQUID STORAGE APPARATUS AND METHOD OF CONTROLLING THE PRESSURE IN THE SAME

(75) Inventors: Hiroyuki Mitsui, Tokyo (JP); Osamu Nakai, Tokyo (JP); Moritarou Asatori, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 404 days.

(21) Appl. No.: 13/639,793

(22) PCT Filed: Apr. 20, 2011

(86) PCT No.: PCT/JP2011/059682
§ 371 (c)(1),
(2), (4) Date: Mar. 21, 2013

(87) PCT Pub. No.: WO2011/132693
PCT Pub. Date: Oct. 27, 2011

(65) Prior Publication Data
US 2013/0199620 A1 Aug. 8, 2013

(30) Foreign Application Priority Data
Apr. 22, 2010 (JP) ................................. 2010-098772

(51) Int. Cl.
*C22B 3/00* (2006.01)
*C22B 3/02* (2006.01)

(52) U.S. Cl.
CPC ......... *C22B 23/0453* (2013.01); *C22B 23/0461* (2013.01); *C22B 23/0469* (2013.01); *C22B 3/02* (2013.01); *Y10T 137/0396* (2015.04); *Y10T 137/3124* (2015.04); *Y10T 137/3127* (2015.04); *Y10T 137/794* (2015.04); *Y10T 137/86187* (2015.04); *Y10T 137/86292* (2015.04)

(58) Field of Classification Search
CPC .............. C22B 23/00–23/065; C22B 23/0453; F17C 2205/0142; F17C 2203/0379
USPC .......... 137/206, 208, 209, 255, 266, 544, 545
See application file for complete search history.

(56) References Cited

U.S. PATENT DOCUMENTS 2,020,325 A * 11/1935 Myhren et al. ................ 423/566
2,548,003 A *  4/1951 Davidson ...................... 137/266
(Continued)

FOREIGN PATENT DOCUMENTS

| JP | 2010-31302 A | 2/2010 |
| JP | 2010-31341 A | 3/2010 |
| JP | 2010-59489 A | 3/2010 |

*Primary Examiner* — Craig Schneider
*Assistant Examiner* — Craig J Price
(74) *Attorney, Agent, or Firm* — Haverstock & Owens LLP

(57) ABSTRACT

The present invention is directed towards a liquid storage apparatus for use in the sulfurization facility for sulfurizing a sulfate solution to produce a sulfide, the apparatus comprising a plurality of liquid storage vessels for storing a slurry or a filtrate after solid/liquid separation, a collective conduit for collectively passing an inactive gas to be fed into the liquid storage vessels or an exhaust gas discharged from the liquid storage vessels, and a pressure control conduit for receiving the flow of the inactive gas and the exhaust gas in order to control the pressure at the inner side of the liquid storage vessels. The pressure control conduit is connected by a junction to the collective conduit and equipped with a pair of pressure control valves mounted at both, front and rear, sides of the junction communicating to the collective conduit.

8 Claims, 5 Drawing Sheets

(56) References Cited

U.S. PATENT DOCUMENTS

| | | | | |
|---|---|---|---|---|
| 2,617,765 | A | * | 11/1952 | Swarr .................... 137/208 |
| 3,035,888 | A | * | 5/1962 | Massey ................. 137/209 |
| 3,797,744 | A | * | 3/1974 | Smith .................... 137/209 |
| 4,019,524 | A | * | 4/1977 | Whitson et al. ........... 137/14 |
| 4,331,635 | A | * | 5/1982 | Arbiter et al. ........... 423/109 |
| 4,629,502 | A | * | 12/1986 | Sherman et al. ........... 423/41 |
| 4,859,375 | A | * | 8/1989 | Lipisko et al. ........... 137/209 |
| 5,035,200 | A | * | 7/1991 | Moriyama et al. ......... 118/693 |
| 5,052,426 | A | * | 10/1991 | Kasper .................... 137/14 |
| 5,148,945 | A | * | 9/1992 | Geatz .................... 137/209 |
| 5,250,273 | A | * | 10/1993 | Hornsey et al. ........... 423/28 |
| 5,607,000 | A | * | 3/1997 | Cripe et al. ............. 137/209 |
| 6,015,066 | A | * | 1/2000 | Kimura et al. ........... 137/208 |
| 7,100,631 | B2 | * | 9/2006 | Liu et al. ............... 137/208 |
| 8,794,257 | B2 | * | 8/2014 | He et al. ................ 137/209 |

* cited by examiner

LIQUID STORAGE APPARATUS AND METHOD OF CONTROLLING THE PRESSURE IN THE SAME

FIELD OF THE INVENTION

The present invention relates to a liquid storage apparatus for use in a sulfurization facility for sulfurizing a sulfate solution such as a crude nickel sulfate solution in a sulfurization step of a wet smelting for nickel oxide ore and a method of controlling the pressure in the same.

The present application asserts priority rights based on JP Patent Application 2010-098772 filed on Apr. 22, 2010. The total contents of disclosure of the Patent Application of the senior filing date are to be incorporated by reference into the present application.

BACKGROUND OF THE INVENTION

A technique of high-pressure acid leach with the use of sulfuric acid has been focused as a wet smelting method for nickel oxide ore. The processing method comprises a succession of wet smelting steps without any dry processing step such as a drying step or a roasting step and will thus be advantageous for energy and cost saving and simultaneously for producing a nickel/cobalt mixture sulfide of which the content of nickel is increased to substantially 50% by weight.

More particularly, the high pressure acid leaching process for producing such a nickel/cobalt mixture sulfide includes, for example, a step (1) of subjecting nickel oxide ores to the high pressure acid leach to produce a crude nickel sulfate aqueous solution which contains zinc as a impurity element in addition to nickel and cobalt, a step (2) of introducing the crude nickel sulfate aqueous solution into a sulfurizing reaction vessel, adding the crude nickel sulfate aqueous solution with a hydrogen sulfide gas for sulfurization of zinc which is contained in the crude nickel sulfate aqueous solution, and subjecting the solution to solid/liquid separation to produce a zinc sulfide and a dezincificated end liquid, a step (3) of introducing the dezincificated end liquid into a sulfurizing reaction vessel, adding the dezincificated end liquid with a hydrogen sulfide gas for sulfurization of nickel and cobalt which are contained in the dezincificated end liquid to produce a slurry, introducing the slurry into a degassing facility for removal of the hydrogen sulfide gas, and subjecting the slurry to solid/liquid separation to produce a nickel/cobalt mixture sulfide and a process exhaust liquid, and a step (4) of purifying a remaining of the hydrogen sulfide gas contained in an exhaust gas which has been produced at both the steps (2) and (3).

The sulfurizing reaction vessels employed at the sulfurization process in the steps (2) and (3) of the high pressure acid leach are implemented by a closed type reactor vessel which has a feed inlet for introducing a reaction start liquid, a discharge outlet for discharging the slurry after the reaction, a feed inlet for supplying the hydrogen sulfide gas, and an exhaust gas outlet for discharging a gaseous component at gaseous phase as the exhaust gas.

Generally, the sulfurization process in the steps (2) and (3) is conducted by a sulfurization facility which comprises, in addition to the sulfurizing reaction vessels described above, a group of tanks including liquid storage vessels and relay vessels for storage of slurry and filtrate liquid after the sulfurizing reaction (referred to simply as liquid storage vessels hereinafter) and solid/liquid separation vessels, feed conduits for feeding the tanks with an intermediate solution such as slurry, an inactive gas, and others, discharge conduits for discharging from tanks, and piping installations for connecting between the tanks.

It has been demanded for carrying out the processing actions at higher efficiency of the steps (2) and (3) in the sulfurization facility in order to recover a wanted sulfide at a higher recovery rate as a variety of relevant techniques were proposed.

For example, disclosed in Patent Literature 1 is a method of controlling the sulfurizing reaction of metals through adjusting the concentration of hydrogen sulfide in a gaseous phase component and precisely determining the oxidation reduction potential (ORP) and the pH scale in a liquid component. Also, a method of adding a sulfide seed crystal thus to accelerating the sulfurizing reaction and simultaneously suppress the adhesion of produced sulfides to the inner surface of the sulfurizing reaction vessel is disclosed in Patent Literature 2. Moreover, a method of separating zinc at first priority through modifying the pH scales and the oxidation reduction potential (ORP) levels in a nickel sulfate aqueous solution which contains cobalt and zinc and its relation are disclosed in Patent Literature 3.

It is known in accordance with those techniques that the step (3), for example, is conducted by introducing a hydrogen sulfide gas of which the concentration of hydrogen sulfide exceeds 95% by volume into the gaseous phase compartment of a sulfurizing reaction vessel, maintaining the operational requirements, which include the concentration of nickel, the amount of supply, the temperature, and the pH scale, of a reaction start liquid having been supplied into the sulfurizing reaction vessel while controlling the inner pressure of the vessel to a predetermined degree, and adding the sulfide seed crystal if required. This results in higher than 95% of the recovery of nickel.

It may be understood for improving further the recovery of nickel at stableness that the sulfurization facility is operated with higher degrees of the temperature and the pressure at its interior. However, that situation will create a problem that the consumption of hydrogen sulfide gas and the cost for purifying an exhaust gas generated by the reactive operation or the cost for preparing the reaction vessels are increased.

Also in a hydrogen sulfide gas producing facility used in a wet smelting plant which is a practical plant for operating the high pressure acid leaching process, the production and use of hydrogen sulfide gas of which the concentration of hydrogen sulfide is lower than 100% by volume is advantageous for the production efficiency. As the result, the hydrogen sulfide gas to be added for the sulfurizing reaction contains 2 to 3% by volume of inactive components including hydrogen, which is a material for the hydrogen sulfide gas producing step, and nitrogen which is slipped into during the hydrogen sulfide gas producing step. More particularly, the hydrogen sulfide gas used for the sulfurizing reaction contains such inactive components as hydrogen and nitrogen which remain inert in the sulfurizing reaction. Consequently, during the continuous operation of the sulfurization step including the steps (2) and (3), the inactive components contained in the hydrogen sulfide gas will be accumulated in the liquid storage vessel where the slurry is stored after the sulfurizing reaction, described above, as well as in the sulfurizing reaction vessel, hence being a cause for lowering the efficiency of the sulfurizing reaction.

It is therefore essential for eliminating the above drawback to improve the efficiency of use of the hydrogen sulfide gas during the sulfurizing reaction. However, the foregoing prior arts fail to explain the improvement of the efficiency of use of the hydrogen sulfide gas.

As for this point, techniques are disclosed in Patent Literature 4, for example, where the efficiency of use of the hydrogen sulfide gas is improved by modifying the volume of the sulfurizing reaction vessel depending on the amount of nickel to be loaded and by recovering and reusing the hydrogen sulfide gas discharged from the sulfurizing reaction vessel. Those techniques allow the use of hydrogen sulfide and the use of an alkali material to be reduced while the recovery of nickel remains at higher efficiency.

However, the techniques disclosed in Patent Literature 4 fail to explain a structural drawback of installing a plurality of the sulfurizing reaction vessels needed in the sulfurization steps (2) and (3). It is hence desired for improving the efficiency of use of the hydrogen sulfide gas to propose new technologies over installation and arrangement of the sulfurization facilities.

In common practice, the sulfurization facility for conducting the prescribed steps (2) and (3) has a plurality of the liquid storage vessels where the slurry after the sulfurizing reaction is received and stored before delivering to the solid/liquid separation vessel. Also, the liquid storage vessels receive filtrates after the solid/liquid separation and repeatedly deliver those to the sulfurizing reaction vessel. The reason for employing a plurality of the liquid storage vessels is that a structural requirement exists for being implemented in some limits by an enclosure type construction and that the quantity of a target to be processed is maximized for increasing the overall production through the utilization for a variety of actions.

FIG. 4 is a structural view schematically showing a conventional liquid storage vessel 50. As shown in FIG. 4, the liquid storage vessel 50 includes an inlet conduit 51 for loading a slurry after the sulfurizing reaction and a filtrate liquid after the solid/liquid separation, a discharge conduit 52 for discharging the slurry and the filtrate liquid, an inactive gas feed conduit 53 for feeding an inactive gas (for example, nitrogen gas) which remains inert in the sulfurizing reaction, and a gas discharge conduit 54 for discharging a gas generated in the liquid storage vessel 50.

FIG. 5 is a structural view schematically showing a plurality of liquid storage vessels $50_n$ installed in a conventional sulfurization facility for conducting the sulfurization of the above described steps (2) and (3). As shown in FIG. 5, each of the liquid storage vessels $50_n$ includes an inactive gas feed conduit $53_n$ and a gas discharge conduits $54_n$. The inactive gas feed conduit $53_n$ and the gas discharge conduit $54_n$ are equipped with pressure control valves $55_n$, $56n$ respectively for modifying the supply of the inactive gas received from an inactive gas feed facility or the discharge of an exhaust gas to a purifying facility thus to control the inner pressure of the liquid storage vessel $50_n$.

In the liquid storage vessel $50_n$ having the foregoing arrangement, the liquid level moves up and down along the inner surface of the liquid storage vessel $50_n$ depending on the coming in and out of the slurry or filtrate liquid during the operation and causes the pressure of a gaseous phase component to be shifted up and down. For compensation, in response to the shifting up and down of the pressure due to the moving up and down of the liquid level, the pressure control valves $55_n$, $56_n$ of the liquid storage vessel $50_n$ are controlled so as to maintain the pressure in the interior of the liquid storage vessel $50_n$ to a constant level. More particularly, the inner pressure can be maintained to a constant level by discharging the gas accumulated in the liquid storage vessel $50_n$ as an exhaust gas and feeding the inactive gas into the liquid storage vessel $50_n$.

However, the exhaust gas contains not only the inactive components but also a portion of the hydrogen sulfide gas and its discharge will result in loss of the hydrogen sulfide gas. More specifically, a portion of the hydrogen sulfide gas is removed out by vaporization from the slurry or the like stored in the liquid storage vessel $50_n$ and then discharged as an exhaust gas, whereby the generation of a sulfide product will be declined. In particular, the liquid storage vessels $50_n$ are installed in a group in the sulfurization facility and their action of controlling the inner pressure to determine the discharge of exhaust gases is carried out separately, whereby the total discharge of the remaining hydrogen sulfide gas as an exhaust gas will inevitably be increased thus to raise the loss of the hydrogen sulfide gas.

Moreover, the exhaust gas discharged from the liquid storage vessels $50_n$ has to be subjected to a purifying process for removing the hydrogen sulfide gas from the exhaust gas through direct exposure to, for example, an alkali processing solution. Consequently, as the discharge of the hydrogen sulfide gas as an exhaust gas becomes high, the consumption of the alkali processing solution to be used at the step (4) will be increased.

As set forth above, the conventional sulfurization facility claims a greater loss of the hydrogen sulfide gas and it is hence desired for increasing the efficiency of use of the hydrogen sulfide gas to propose a new technology for providing an improvement of the installation and arrangement of sulfurization facilities. In particular, since the hydrogen sulfide gas is enabled to use repeatedly for the sulfurizing reaction as having stayed in the liquid storage vessels $50_n$ where the slurry after the sulfurizing reaction and the filtrate liquid after the solid/liquid separation are stored, it is significantly needed to suppress the escape from the liquid storage vessels $50_n$ with higher effectiveness.

LITERATURE OF THE PRIOR ART

Patent Literature

Patent Literature 1: JP-A-2003-313517
Patent Literature 2: JP-A-2005-350766
Patent Literature 3: JP-A-2002-454624
Patent Literature 4: JP-A-2010-031302

DISCLOSURE OF THE INVENTION

Problems to be Solved by the Invention

The present invention is proposed in view of the above described problems of the prior art and its object is to provide a liquid storage apparatus for use in a sulfurization facility for conducting a sulfurization step in a wet smelting for nickel oxide ore, where the structural modification of its liquid storage vessels is improved so that the consumption of a hydrogen sulfide gas used in a sulfurization step and the consumption of an alkali solution used for processing an exhaust gas can be reduced and the overall cost of operation will thus be minimized.

Means for Solving the Problems

We, the inventors, have repeatedly studied with enthusiasm over a method of improving the efficiency of use of a hydrogen sulfide gas in conjunction with a liquid storage apparatus for use in a sulfurization facility for carrying out a wet smelting for nickel oxide ore. As a result, it is found that, in a liquid storage apparatus including a plurality of liquid storage vessels, the efficiency of use of the hydrogen sulfide gas in the sulfurization step can be improved and also the consumption of an alkali processing liquid for processing a discharge of the hydrogen sulfide gas can be reduced by controllably modifying the charge of an inactive gas and the discharge of the hydrogen sulfide gas and the present invention has been accomplished.

More specifically, as a sulfurizing reaction apparatus according to the present invention, provided is a liquid storage apparatus for use as a sulfurization facility for sulfurizing a sulfate solution to produce a sulfide in the sulfurizing step of a wet smelting for nickel oxide ore, comprising a plurality of liquid storage vessels, each vessel including a feed conduit for feeding a slurry after the sulfurizing reaction and a filtrate after a solid/liquid separation, a gas charge/discharge conduit for charging an inactive gas and discharging a gaseous component at gaseous phase as an exhaust gas, and a discharge conduit for discharging the slurry or the filtrate, a collective conduit arranged of a branched shape having a series of joints at one end thereof aligned in parallel with the gas charge/discharge conduits of their respective liquid storage vessels and connected via the joints to the gas charge/discharge conduits for collectively passing the inactive gas to be fed to the liquid storage vessels and the exhaust gas discharged from the liquid storage vessels, and a pressure control conduit for receiving at one end the inactive gas to be fed to the liquid storage vessels and releasing at the other end the exhaust gas discharged from the liquid storage vessels, characterized in that the pressure control conduit is connected by a junction to the other end of the collective conduit and is equipped with a pair of pressure control valves mounted thereon at both, front and rear, sides of the junction so that both the feed of the inactive gas to the liquid storage vessels and the discharge of the exhaust gas from the liquid storage vessels can be controlled by the pressure control valves.

Also, a pressure control method according to the present invention is provided for use with the above described liquid storage apparatus and characterized by enabling of feeding the inactive gas with the one end of the pressure control conduit being connected to an inactive gas feed facility and of discharging the exhaust gas with the other end of the pressure control conduit being connected to a purifying facility for processing the exhaust gas, when the pressure at the inner side of the liquid storage vessels is lower than 0.5 kPa, feeding the inactive gas to the liquid storage vessels by adjusting the pressure control valve at the inactive gas feed facility side, and when the pressure at the inner side of the liquid storage vessels is higher than 1.0 kPa, discharging as the exhaust gas a gaseous component at gaseous phase in the liquid storage vessels by adjusting the pressure control valve at the purifying facility side.

It is further characterized in that each of the liquid storage vessels receives the slurry or the filtrate from its feed conduit and discharges the same from its discharge conduit individually.

Advantage of the Invention

The liquid storage apparatus and the pressure control method according to the present invention are capable of in a wet smelting for nickel oxide ore, improving the efficiency of use of the hydrogen sulfide gas and reducing both the consumption of the hydrogen sulfide gas in the sulfurization step and the consumption of the alkali processing liquid used for processing the exhaust gas, whereby the overall cost of operation can greatly be decreased and their industrial advantage will significantly be high.

BEST MODES FOR EMBODYING THE INVENTION

A liquid storage apparatus and a method of controlling the pressure in the same according to embodiments of the present invention are provided particularly for use in a sulfurization facility for sulfurizing a sulfate solution such as a crude nickel sulfate solution in a sulfurization step of a wet smelting for nickel oxide ore.

The liquid storage apparatus and the method of controlling the pressure in the same according to the embodiments will be described in the following order and in more detail, referring to the relevant drawings.

1. Wet Process for Nickel Oxide Ore (High Pressure Acid Leach)
  1-1. First Step (Sulfate Solution Producing Step)
  1-2. Second Step (Zinc Sulfide Producing Step)
  1-3. Third Step (Nickel/cobalt Mixture Sulfide Producing Step)
  1-4. Fourth Step (Exhaust Gas Processing Step)
2. Sulfurization Facility
  2-1. Liquid Storage Apparatus
  2-2. Pressure Control Reaction of Liquid Storage Apparatus
3. Summary
4. Examples

1. WET PROCESS FOR NICKEL OXIDE ORE (HIGH PRESSURE ACID LEACH)

Prior to the description of the liquid storage apparatus and the method of controlling the pressure in the same according to the embodiments, a wet process for nickel oxide ore will be explained in the form of a high pressure acid leaching process which includes a sulfurization step where the apparatus and the method are employed.

Figure 1:
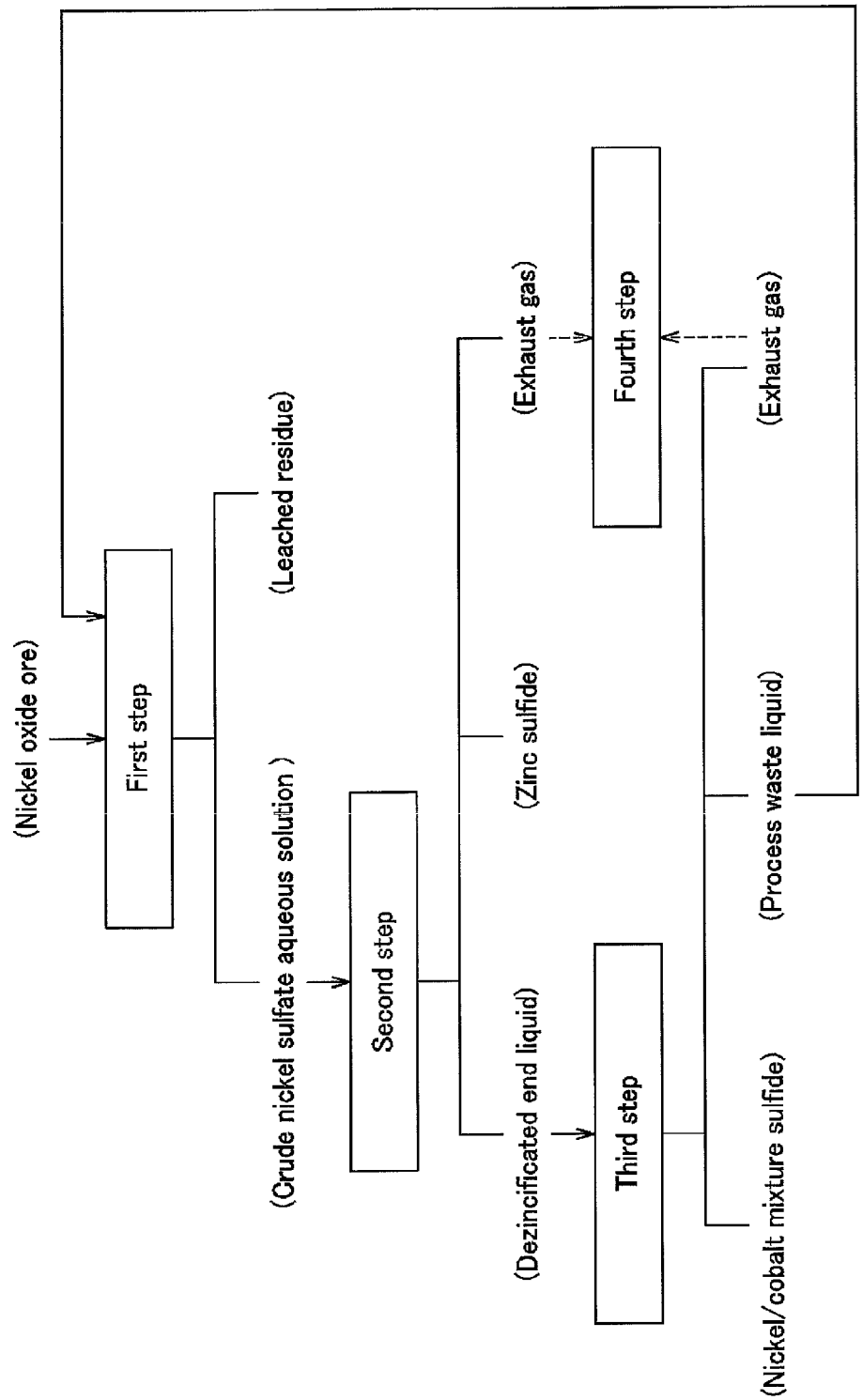
FIG. 1 is a diagram showing an example of the procedure of a wet smelting of nickel oxide with the high pressure acid leach.

FIG. 1 is a view schematically showing steps of the high pressure acid leaching process for processing the nickel oxide ore. As shown in FIG. 1, the wet process of the high pressure acid leach comprises a step (first step) of subjecting the nickel oxide ore to the high pressure acid leach to produce, in addition to nickel and cobalt, a sulfate solution such as a crude nickel sulfate aqueous solution which contains zinc as an impurity element, a step (second step) of introducing the sulfate solution into a sulfurizing reaction vessel (A), sulfurizing zinc contained in the sulfate solution with the addition of a hydrogen sulfide gas, and subjecting the solution to solid/liquid separation to produce a zinc sulfide and a dezincificated end liquid, a step (third step) of sulfurizing nickel and cobalt contained in the dezincificated end liquid with the addition of the hydrogen sulfide gas to produce a slurry, introducing the shiny into a degas facility where the hydrogen sulfide gas is removed, and subjecting the slurry to solid/liquid separation to produce a nickel/cobalt mixture sulfide and a process waste liquid, and a step (fourth step) of introducing the exhaust gas discharged from the second step and the third step into a purifying tower and making a direct contact with an alkali processing solution for removal of the hydrogen sulfide gas thus to produce a purified exhaust gas and a purifying tower waste liquid.

The liquid storage apparatus according to the embodiment is arranged for carrying out its operation such as a cycle of receiving from the sulfurizing reaction vessels (A), (B) and storing the slurry to be used at the second step and the third step described above, and delivering the same to a solid/liquid separation device, and delivering a filtrate liquid produced by the solid/liquid separation to the sulfurizing reaction vessels (A), (B). The sulfurizing reaction vessels (A), (B) are discriminated from each other to clarify that the two are used at their respective sulfurizing reaction steps.

<1-1. First Step (Sulfate Solution Producing Step)>

The first step involves a high pressure acid leaching process for nickel oxide ore in order to produce, in addition to nickel and cobalt, a sulfate solution containing zinc as an impurity element.

More specifically, the first step comprises a leaching step of adding the slurry of nickel oxide ore with sulfuric acid for leaching under a high temperature, over 200° C., and a high pressure in an autoclave to produce a leached slurry, a solid/liquid separation step of separating a leached residue and a leached liquid containing nickel and cobalt from the leached slurry, and a neutralization step of modifying the pH scale of the leached liquid containing nickel, cobalt, and impurity elements to produce a neutralized precipitate slurry containing impurity elements such as iron and others and a sulfate solution which is a sulfurizing reaction start liquid from which most of the impurity elements have been removed.

(1) Leaching Step

The leaching step involves adding the slurry of nickel oxide ore with sulfuric acid for leaching under a high temperature, over 200° C., and a high pressure to produce a leached slurry.

The high pressure acid leaching at the leaching step is not limitative and its simple example is as follows. More particularly, the method starts with subjecting nickel oxide ores to slurry process to produce an ore slurry. Then, the ore slurry being conveyed is added with sulfuric acid, mixed with a blow of higher pressure air served as an oxidizer and a blow of high pressure steam served as a heating source, agitated under control with predetermined levels of pressure and temperature to produce a leached slurry which comprises a leached residue and a leached liquid, the leached liquid containing nickel and cobalt.

Since the leaching is conducted under a favorable pressure, for example, 3 to 6 MPaG, determined by a predetermined temperature, a high-temperature high-pressure container (i.e. autoclave) which conforms to those requirements can be used for the leaching. This allows the leaching rate of both nickel and cobalt to be over 90% and preferably over 95%.

The nickel oxide ore may fundamentally be a so-called laterite ore such as limonite or saprolite. The content of nickel in laterite ranges commonly 0.5 to 3.0% by mass as is present as hydroxide or sileceous magnesia (magnesium silicate). The content of iron ranges 10 to 50% by mass as is present in the form of trivalent hydroxide (goethite, FeOOH) while sileceous magnesia contains partially divalent iron.

The concentration of slurry is not limitative but largely depends on the property of nickel oxide ore to be processed. The concentration of the leached slurry is preferably as high as possible and may be set in common to substantially 25 to 45% by mass. When the concentration of the leached slurry remains lower than 25% by mass, the facility for leaching process has to be large in order to have an equal length of residence time and the amount of acid to be added for controlling the concentration of acid in action will be increased. Also, the content of nickel in the leached liquid will be low. On the other hand, when the concentration of the leached slurry exceeds 45% by mass, the facility for leaching process remains small but the viscosity (yield stress) of the slurry becomes high, thus creating a problem that the flow of the slurry to be conveyed becomes troublesome (due to frequent occurrence of blockage in the conduits, high consumption of energy, and so on).

At the leaching step, the leaching reaction and the high temperature hydrolysis reaction represented by the following expressions (I) to (V) conduct leaching of nickel and cobalt as sulfates and fixing of leached iron sulfate in the form of hematite. However, since the fixing of iron ions is not perfectly achieved, the leached slurry produced contains generally divalent and trivalent iron ions, in addition to nickel and cobalt, in its liquid phase.

(Leaching Reaction)

$$MO + H_2SO_4 \rightarrow MSO_4 + H_2O \tag{I}$$

(where M is selected from, for example, Ni, Co, Fe, Zn, Cu, Mg, Cr, and Mn.)

$$2FeOOH + 3H_2SO_4 \rightarrow Fe_2(SO_4)_3 + 4H_2O \tag{II}$$

$$FeO + H_2SO_4 \rightarrow FeSO_4 + H_2O \tag{III}$$

(High Temperature Hydrolysis Reaction)

$$2FeSO_4 + H_2SO_4 + \tfrac{1}{2}O_2 \rightarrow Fe_2(SO_4)_3 + H_2O \tag{IV}$$

$$Fe_2(SO_4)_3 + 3H_2O \rightarrow Fe_2O_3 + 3H_2SO_4 \tag{V}$$

The temperature of operation in the leaching step is not limitative but may preferably be 220 to 280° C. and more preferably 240 to 270° C. When the temperature stays within a range of 220 to 280° C., most of iron is fixed in the form of hematite. On the other hand, when the temperature is lower than 220° C., the high temperature hydrolysis reaction slows down thus to leave a dissolved state of iron in the reactive solution, whereby increasing the load at the succeeding neutralization step for removing iron and making the separation of nickel more difficult. Also, when the temperature is higher than 280° C., the high temperature hydrolysis reaction remains progressed but the selection of the material of a vessel employed for the high temperature hydrolysis reaction becomes troublesome and the cost of steam supply for increasing the temperature will probably be increased as not favored.

Moreover, the amount of sulfuric acid to be used in the leaching step is not limitative but may preferably be excessive enough to leach iron from the nickel oxide ore. For example, the amount ranges 200 to 500 kg per one ton of the ore. When the amount of sulfuric acid to be added exceeds 500 kg per one ton of the ore, the cost of sulfuric acid will soar as is not favorable.

The pH scale of the leached liquid produced by the leaching process is preferably 0.1 to 1.0 in view of the filtration of a leached residue, containing hematite, produced in the solid/liquid separation step.

As set forth above, the leaching step produces a leached slurry of which the residue contains mostly hematite. The leached slurry is then conveyed to the succeeding solid/liquid separation step.

(2) Solid/Liquid Separation Step

At the solid/liquid separation step, the leached slurry produced in the above described leaching step is rinsed at multiple stages to produce a leached liquid, containing nickel, cobalt, and zinc as an impurity element, and a leached residue.

The solid/liquid separation step involves mixing the leached slurry with a rinsing liquid and subjected to the mixture to solid/liquid separation in a thickener. More particularly, the slurry is diluted with the rinsing liquid and then, its leached residue is condensed as a precipitate in the thickener thus to reduce a nickel component in the leached residue in proportion to the degree of dilution. In a practice, a number of the thickeners having the above functions are connected one after another for multiple stages.

The rinsing process at multiple stages in the solid/liquid separation step is not limitative but may preferably be carried out by a CCD (counter current decantation) method for exposing to a counter current of the rinsing liquid which contains non of nickel. This method can decrease the amount of the rinsing liquid to be fed additionally into the system and simultaneously increase the rate of recovery of nickel and cobalt to higher than 95%.

The rinsing liquid used in the solid/liquid separation step is not of limitations but may preferably be a liquid which contains non of nickel and gives no effect on the step and more preferably of which the pH scale is 1 to 3. Also, the rinsing liquid may preferably be used in repeated cycles.

The rate of solid in the precipitate residue is not limitative but may preferably range 30 to 50% by weight. More specifically, when the rate of solid is smaller than 30% by weight, the adhesion of water remains high and the loss of nickel will increase. On the other hand, when the rate of solid exceeds 50% by weight, the action of agitation and conveyance will be difficult.

(3) Neutralization Step

The neutralization step involves controlling the oxidation of the leached liquid, produced in the solid/liquid separation step and containing impurities in addition to nickel and cobalt, thus to modify the pH scale and produce a neutralized precipitate slurry containing trivalent iron and a sulfate solution such which is a crude nickel sulfate solution served as a sulfurizing reaction start liquid from which most of the impurities have been removed. Consequently, the excess of acid involved in the high pressure acid leaching step can be neutralized while the trivalent iron ions existing in the solution are removed out.

The pH scale in the neutralization step is not limitative but may preferably be not higher than 4 and more preferably 3.2 to 3.8. When the pH scale is higher than 4, the generation of nickel hydroxide will increase.

It is also preferred in the neutralization step that the iron ions existing as divalent ions in the solution are protected from being oxidized during the removal of the trivalent iron ions contained in the solution and that the solution is prevented from being oxidized by the incoming and turbulent flows of air.

The temperature in the neutralization step may preferably be 50 to 80° C. When the temperature is set to lower than 50° C., the precipitate becomes too small and will thus give an adverse effect on the solid/liquid separation step. On the other hand, when the temperature is set to higher than 80° C., the resistance to corrosion of the materials of the facilities will decline and the cost of energy for heating up will increase.

<1-2. Second Step (Zinc Sulfide Production Step)>

The second step involves adding the sulfate solution, produced in the first step and containing zinc as an impurity element in addition to nickel and cobalt, with a hydrogen sulfide gas to produce a zinc sulfide and a dezincificated end liquid.

More particularly, in the second step, the sulfate solution produced in the first step and containing zinc as an impurity element in addition to nickel and cobalt is introduced into the sulfurizing reaction vessel (A). Then, the sulfurizing reaction vessel is fed with a hydrogen sulfide gas for sulfurizing zinc contained in the sulfate solution (the sulfurizing reaction). This is followed by the solid/liquid separation process thus to produce a zinc sulfide and a dezincificated end solution.

The second step is designed for protecting the nickel/cobalt mixture sulfide, which is recovered in the succeeding third step, from being mixed up with zinc. Accordingly, the condition of the sulfurizing reaction in the second step may preferably reside in the sulfurization of zinc having a first priority over the sulfurization of nickel and cobalt. It is noted that when the content of zinc in the crude nickel sulfate aqueous solution is too small to give adverse effects on the quality of the nickel/cobalt mixture sulfide produced in the succeeding step, the second step can be eliminated.

The sulfurizing reaction in the second step is represented by the following expressions (VI) to (VIII).

<Sulfurizing Reaction>

$$H_2S\ (g) + H_2O \rightarrow H_2S\ \text{in aq} \tag{VI}$$

$$H_2S \rightarrow H^+ + HS^- \rightarrow 2H^+ + S^{2-} \tag{VII}$$

$$M^{2+} + 2H^+ + S^{2-} \rightarrow 2H^+ + MS\downarrow \tag{VIII}$$

(where M is Zn or the like.)

As shown in the above expressions (VI) to (VIII), the sulfurizing reaction is based on a reaction of the hydrogen sulfide gas, introduced into the sulfurizing reaction vessel (A), being dissolved in water and a reaction of the hydrogen sulfide dissolving into water. At the time, the concentration of the dissolved hydrogen sulfide is commonly proportional to the pressure of the hydrogen sulfide in a gaseous phase in the sulfurizing reaction vessel, according to the Henry's law. It is therefore essential for increasing the speed of the prescribed gas/liquid reaction to raise the partial pressure of the hydrogen sulfide in the gaseous phase. However, since the hydrogen sulfide gas being introduced contains an inactive component such as nitrogen gas, the reaction speed will be slowed down by the accumulation of the inactive components in the sulfurizing reaction vessel (A).

For compensation, the pressure at the inside of each of the sulfurizing reaction vessels (A) is controlled to periodically discharge a gaseous form of the inactive components accumulated in the sulfurizing reaction vessel (A). More specifically, when the sulfurizing reaction vessel (A) is accumulated with the inactive components and its inner pressure rises up and exceeds a predetermined control level, the inactive components at the gaseous phase are removed out through a pressure control valve from the sulfurizing reaction vessel (A). A mechanism for feeding the sulfurizing reaction vessel (A) with the hydrogen sulfide gas is provided as operated by a manner of controlling the inner pressure of the sulfurizing reaction vessel (A) to not higher than 10% of the pressure of the hydrogen sulfide gas being fed so that the hydrogen sulfide gas is moderately reacted with zinc.

The temperature at the sulfurizing reaction in the second step is particularly not limitative but may preferably be 65 to 90° C. The sulfurizing reaction is generally accelerated when the temperature is high. In case that the temperature exceeds 90° C., unwanted problems may possibly occur that the cost for heating up increases and that the sulfurizing reaction vessel (A) is adhered with sulfides due to the slow speed of the reaction.

Also, the feeding of the hydrogen sulfide gas into the sulfurizing reaction vessel (A) is particularly not limitative but may preferably be carried out by delivering a blow of gas into the upper space (at the gaseous phase) of the sulfurizing reaction vessel (A) or into the liquid in the sulfurizing reaction vessel (A) while the liquid being mechanically agitated.

The liquid storage apparatus according to the embodiment forms a sulfurization facility together with the sulfurizing reaction vessels (A) used in the second step. The liquid storage apparatus having a number of the liquid storage vessels is arranged in which the slurry produced by the sulfurizing reaction in the sulfurizing reaction vessels (A) is received by and stored in some of the liquid storage vessels. The liquid storage vessels then deliver the slurry to the solid/liquid separation vessels where the solid/liquid separation process is carried out. The liquid storage apparatus according to the embodiment will be described later in more detail.

<1-3. Third Step (Nickel/cobalt Mixture Sulfide Production Step)>

At the third step, with the hydrogen sulfide gas being added, nickel and cobalt contained in the dezincificated end liquid produced in the second step are sulfurized to produce a nickel/cobalt mixture sulfide and a process waste liquid.

More particularly, in the third step, the dezincificated end liquid produced in the second step is introduced into the sulfurizing reaction vessel (B) and added with the hydrogen sulfide gas for sulfurization of nickel and cobalt contained in the dezincificated end liquid. Then, the solid/liquid separation process is carried out to produce a nickel/cobalt mixture sulfide and a process waste liquid. The removal of the hydrogen sulfide gas from the shiny is conducted for purifying the process waste liquid.

In the third step, the same reaction as of the sulfurizing reaction in the second step as represented by the expressions (VI) to (VIII) is carried out. In the sulfurizing reaction in the third step, M in the expressions represents Ni and Co.

Also, during the sulfurizing reaction of the third step, a seed crystal composed of a sulfide containing nickel and cobalt may be introduced into the sulfurizing reaction vessel (B) if desired. The amount of the seed crystal to be fed is not limitative but may be equal to 150 to 400% by mass for the amount of nickel and cobalt loaded into the sulfurizing reaction vessel (B). Since the supply of the seed crystal promotes nucleation of a sulfide on the surface of the seed crystal thus to make an easy-to-separate condition, the sulfurizing reaction can be conducted with a lower degree of the temperature. In addition, the generation of very small nucleuses of the sulfide in the sulfurizing reaction vessel (B) can be suppressed, whereby minimizing the adhesion of produced sulfide components to the inner surface of the sulfurizing reaction vessel (B). Moreover, the diameter of particles of the products can be controlled by modifying the diameter of particles of the seed crystal to be introduced.

The conditions for the actions of controlling the pressure and the temperature for the sulfurizing reaction in the sulfurizing reaction vessels (B) and feeding the hydrogen sulfide gas may be equal to those of the second step described above. Also, a mechanism for loading the hydrogen sulfide gas into the sulfurizing reaction vessels (B) is operated by controlling the pressure at the inner side of the sulfurizing vessels (B) to 50 to 80% of the pressure of feeding the hydrogen sulfide gas.

The liquid storage apparatus according to the embodiment forms a sulfurization facility together with the sulfurizing reaction vessels (B) used in the third step. The liquid storage apparatus having a number of the liquid storage vessels is arranged in which the slurry produced by the sulfurizing reaction in the sulfurizing reaction vessels (B) and a remaining liquid containing the hydrogen sulfide gas after the recovery of nickel and cobalt are received by and stored in some of the liquid storage vessels. The liquid storage vessels then deliver the slurry to the solid/liquid separation vessels where the solid/liquid separation process is carried out. The liquid storage apparatus according to the embodiment will be described later in more detail. The liquid storage apparatus used in the third step is installed separately of the liquid storage apparatus which forms the sulfurization facility for conducting the second step.

<1-4. Fourth Step (Exhaust Gas Processing Step)>

In the fourth step, the exhaust gas generated and discharged from both the second step and the third step is processed using an alkali processing liquid.

More particularly, in the fourth step, the exhaust gas discharged from the sulfurizing reaction vessels (A) and the liquid storage vessels used in the second step, from the sulfurizing reaction vessels (B) and the liquid storage vessels used in the third step, and from the degas facility, all described previously, is delivered to a purifying facility. At the purifying facility, the exhaust gas is subjected to direct contact with the alkali processing liquid for purification thus and, as a result, a purified exhaust gas and a purifying tower waste liquid are produced.

The purifying facility used in the fourth step is not of limitations but may preferably be of a type, i.e. a scrubber, where the contact of the exhaust gas with an alkali processing liquid can effectively be executed.

As set forth above, the exhaust gas to be processed in the fourth step is discharged from the sulfurizing reaction vessels (A), (B) and the liquid storage vessels used in the second and third steps and hence contains amounts of the hydrogen sulfide gas employed in the sulfurizing reaction. In the fourth step, the hydrogen sulfide gas contained in the exhaust gas is purified using an alkali processing liquid. Accordingly, when the hydrogen sulfide gas contained in the exhaust gas is abundant, its discharge results in a higher rate of the loss and the consumption of the alkali processing liquid for purifying action will increase.

2. SULFURIZATION FACILITY

The sulfurization facility used for conducting the wet process for nickel oxide ore in the second and third steps will now be described. The sulfurization facility comprises chiefly sulfurizing reaction vessels for conducting the sulfurizing reaction, liquid storage vessels for storing a slurry after the sulfurizing reaction and a filtrate after the solid/liquid separation, feed conduits for delivering intermediate fluids including the slurry and inactive gas to tanks, discharge conduits for discharging from the tanks, and piping installations for connecting between the sulfurizing reaction vessels and the liquid storage vessels.

The sulfurizing reaction vessel is commonly of a enclosure type having a feed inlet for feeding a reaction start liquid such as a sulfate solution, a discharge outlet for discharging the slurry after the reaction, a charge inlet for charging the hydrogen sulfide gas, and an exhaust gas outlet for discharging as the exhaust gas a portion of gas lodged in the sulfurizing reaction vessel. The slurry produced by the sulfurizing reaction in the sulfurizing reaction vessel is delivered to and stored in the liquid storage apparatus according to the embodiment. The liquid storage apparatus also receives and stores the filtrate after the solid/liquid separation. The liquid storage apparatus and the method of controlling the pressure in the same will be descried in more detail in accordance with the embodiments.

<2-1. Liquid Storage Apparatus>

The liquid storage apparatus of the embodiment is designed for use in the sulfurization facility where a sulfate solution is sulfurized to produce a sulfide in the sulfurization step of the wet process for nickel oxide ore and adapted for improving the efficiency of use of hydrogen sulfide gas. The liquid storage apparatus can decrease the consumption of the hydrogen sulfide gas and also the consumption of an alkali processing liquid which is used in the fourth step for processing the exhaust gas containing an amount of the hydrogen sulfide gas.

Figure 2:
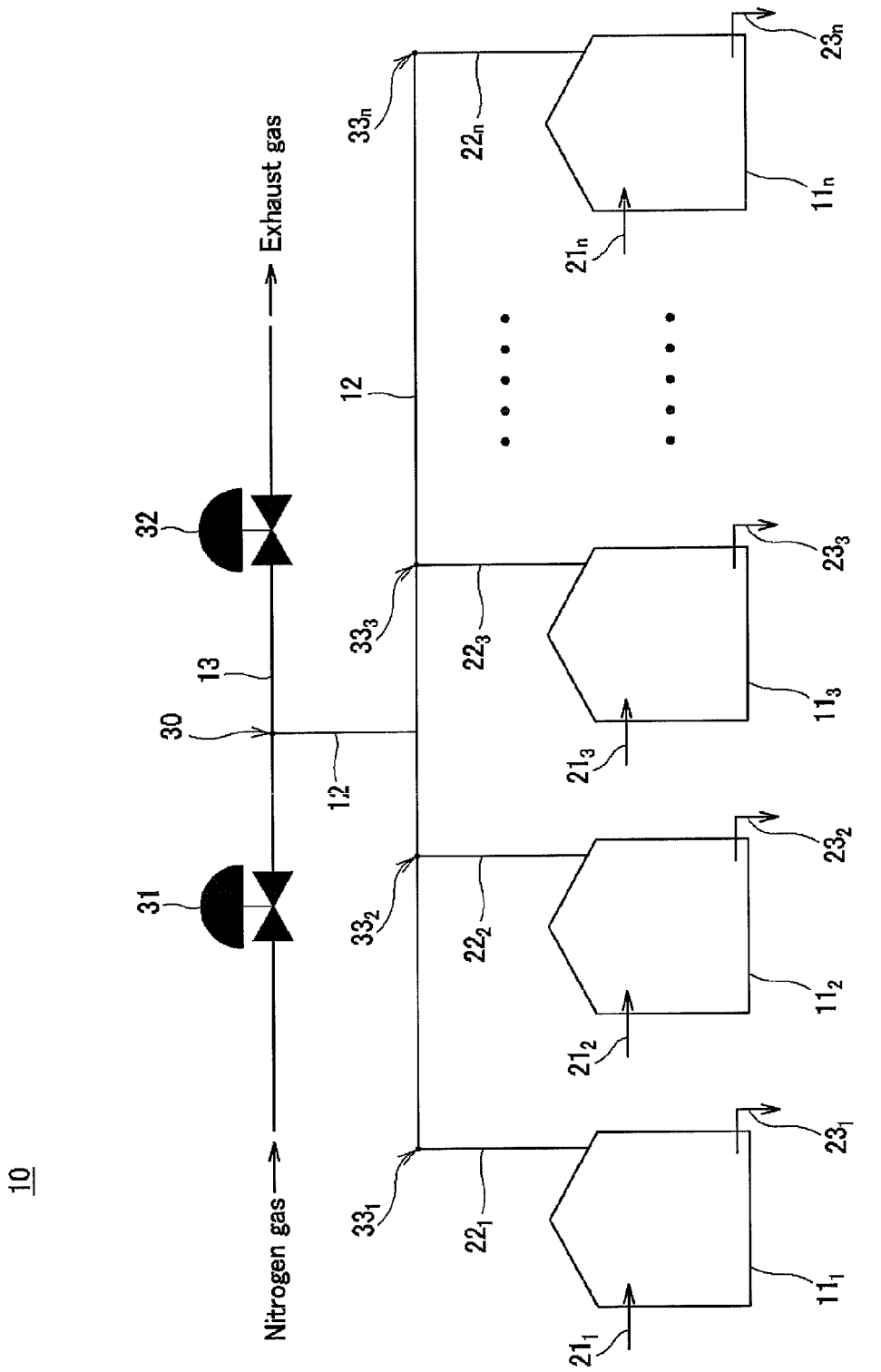
FIG. 2 is a view schematically showing the arrangement of a liquid storage apparatus according to the present invention.

FIG. 2 is a view schematically showing the liquid storage apparatus of the embodiment. As shown in FIG. 2, the liquid storage apparatus 10 comprises a plurality of liquid storage vessels 11 ($11_1$, $11_2$, $11_n$ (referred as $11_n$ hereinafter)) for storing a slurry produced by the sulfurization of sulfate solution in the second and third steps or a filtrate after the solid/liquid separation, a collective conduit 12 for collectively passing an inactive gas such as nitrogen gas to be fed to each of the liquid storage vessels $11_n$ or an exhaust gas discharged from each of the liquid storage vessels $11_n$, and a pressure control conduit 13 for controlling the pressure at the inner side of the liquid storage vessels $11_n$ through adjusting a flow of the exhaust gas as well as the inactive gas.

Liquid Storage Vessel

The liquid storage vessel $11_n$ is provided for receiving from the sulfurizing reaction vessel a slurry produced by sulfurization of the sulfate solution, storing the slurry, and delivering the slurry to a solid/liquid separation vessel. Also, it is arranged for receiving and storing a filtrate produced by the solid/liquid separation in the solid/liquid separation vessel and repeatedly delivering the filtrate to the sulfurizing reaction vessels. As described, the liquid storage apparatus of the embodiment includes a plurality of the liquid storage vessels $11_n$ which are used in versatility for carrying out their respective tasks. The number of the liquid storage vessels $11_n$ is not limitative but may selectively be determined depending on the rate of production.

Figure 3:
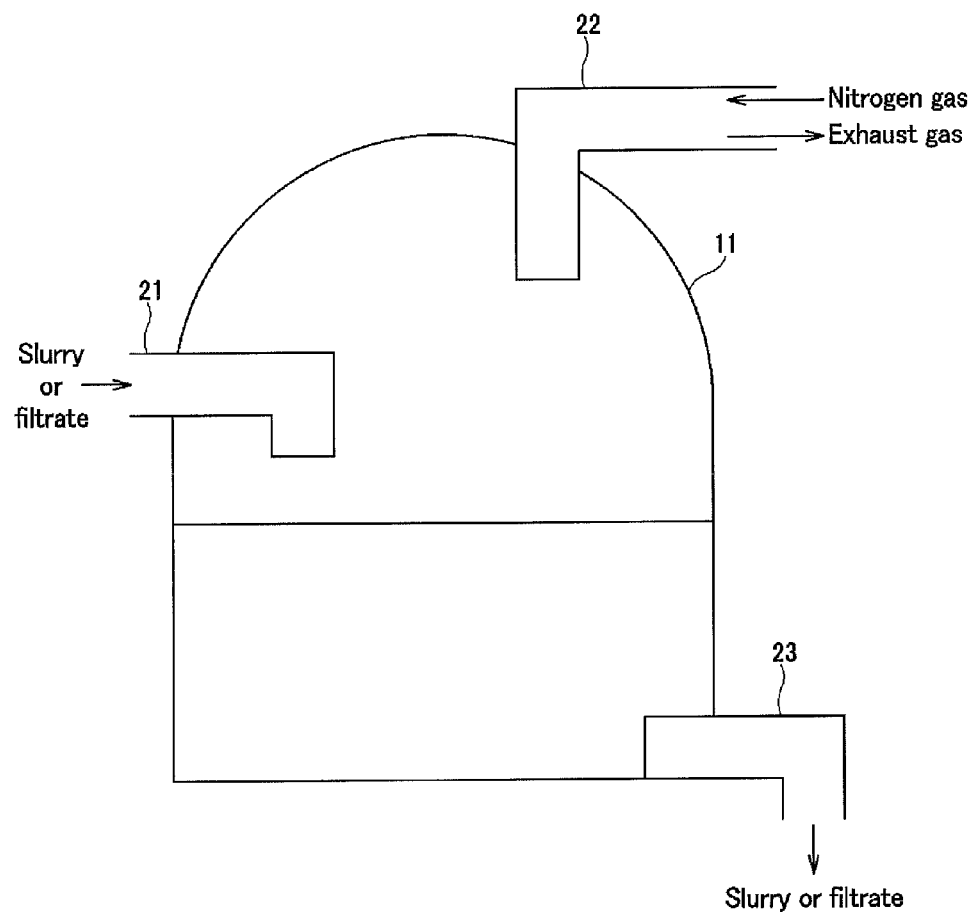
FIG. 3 is a view schematically showing a liquid storage vessel installed in the liquid storage apparatus according to the present invention.
Figure 4:
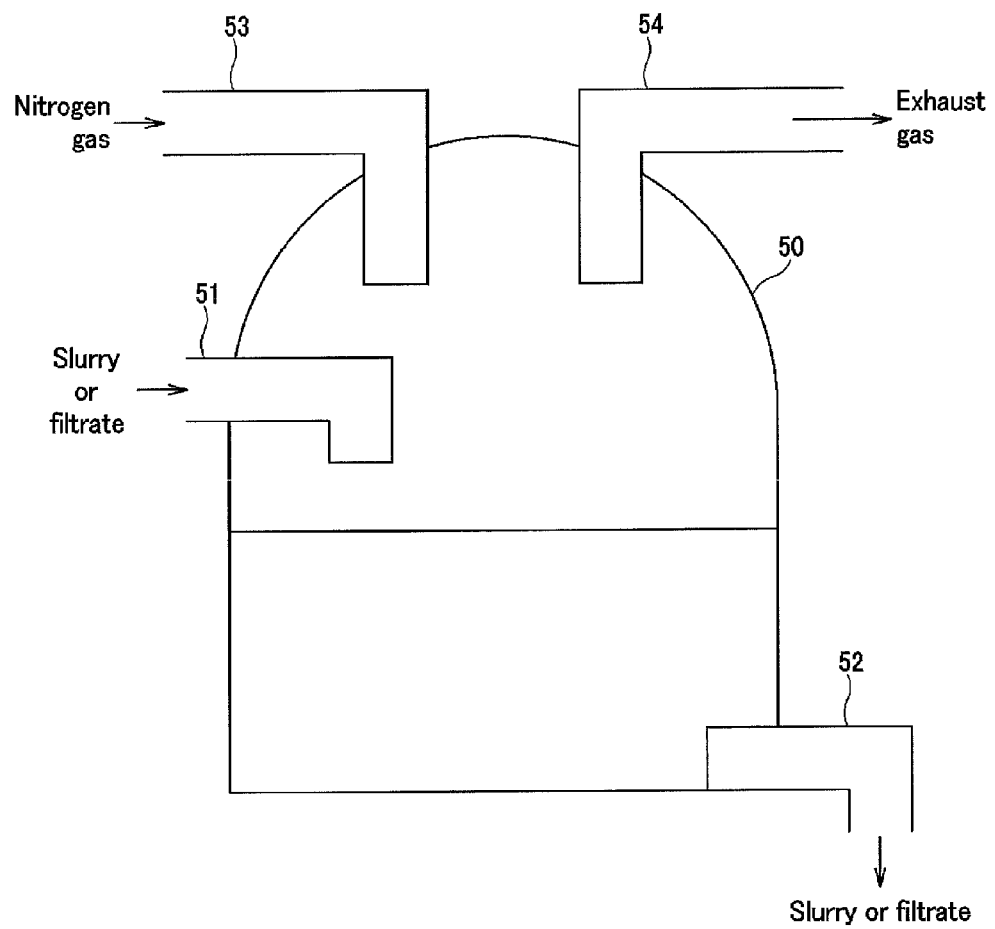
FIG. 4 is a view schematically showing a conventional liquid storage vessel.
Figure 5:
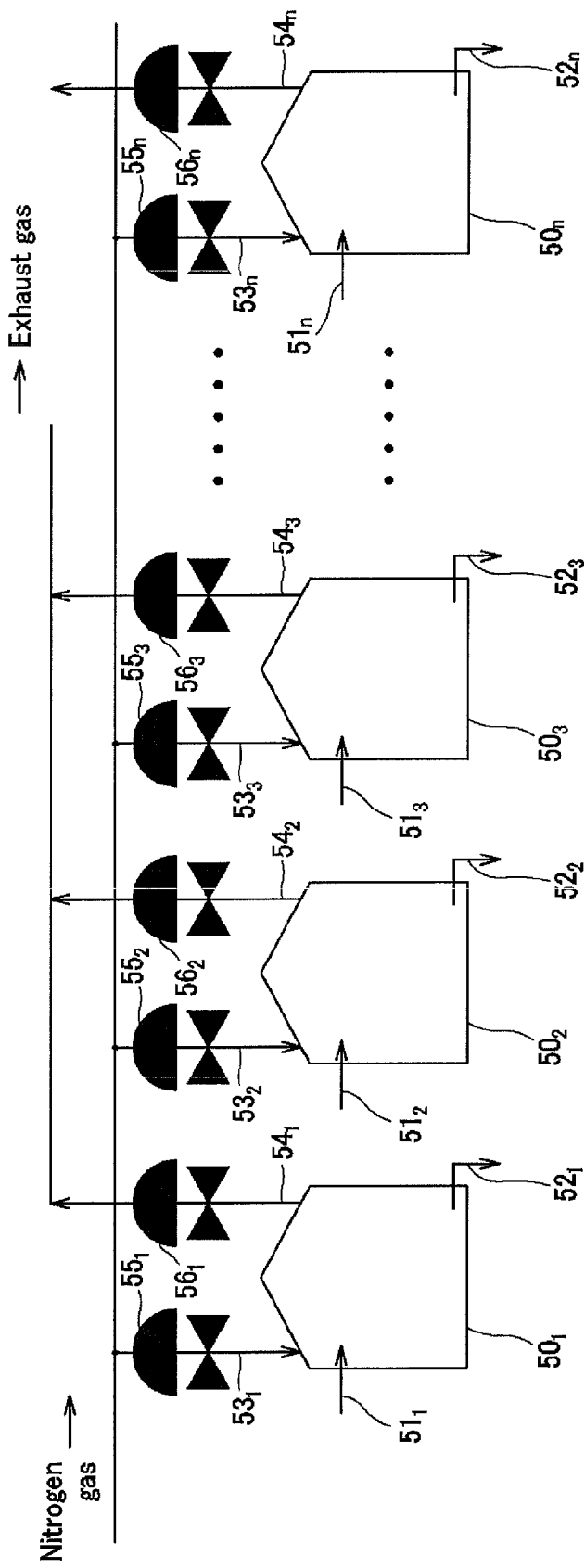
FIG. 5 is a view schematically showing the arrangement of a series of liquid storage vessels installed in a conventional sulfurization facility.

FIG. 3 is a structural view schematically showing the liquid storage vessel 11 in the liquid storage apparatus 10 of the embodiment. More specifically, the liquid storage vessel 11 includes a feed conduit 21 for feeding a slurry after the sulfurizing reaction or a filtrate after the solid/liquid separation, a charge/discharge conduit 22 for charging an inactive gas and discharging a gaseous component at gaseous phase as the exhaust gas, and a discharge conduit 23 for discharging the slurry or the filtrate from its storage.

The feed conduit 21 delivers the slurry produced from the sulfurization of the sulfate solution in the sulfurizing reaction vessels. Alternatively, it delivers the filtrate after the solid/liquid separation in the solid/liquid separation vessels. The liquid storage vessels $11_n$ are accompanied with their respective feed conduits 21 through which the slurry and the filtrate are fed into the liquid storage vessels $11_n$ individually.

The charge/discharge conduit 22 charges the liquid storage vessel 11 with the inactive gas such as nitrogen gas which gives no effect on the sulfurizing reaction and is delivered from an inactive gas feed facility and discharges as the exhaust gas a portion of gaseous component at gaseous phase in the liquid storage vessel 11. The liquid storage vessels $11_n$ are accompanied with their respective charge/discharge conduits 22 through which the inactive gas is fed into and discharged from the liquid storage vessels $11_n$ individually.

As described, in virtue of the charge/discharge conduit 12 through which the inactive gas is fed into the liquid storage vessel 11 and the exhaust gas is discharged from the liquid storage vessel 11, the pressure at the inner side of the liquid storage vessel 11 can be controlled hence avoiding any damage to the liquid storage vessel 11.

The hydrogen sulfide gas received by the sulfurizing reaction vessel for sulfurizing reaction stays almost in equilibrium because of a combination of vaporizing of the slurry and dissolution into the slurry in the liquid storage vessel 11.

Also, in the liquid storage apparatus 10 of the embodiment in particular, the charge/discharge conduits $22_n$ of the liquid storage vessels $11_n$ are connected with the single collective conduit 12, which will be described later, while the collective conduit 12 is connected to the single pressure control conduit 13, which will be described later. The pressure control conduit 13 allows through which the feed of the inactive gas and the discharge of the exhaust gas is carried out corresponding to the inner pressure throughout the liquid storage vessels $11_n$.

Consequently, since a plurality of the liquid storage vessels $11_n$ of the liquid storage apparatus 10 are enabled to act as a single liquid storage vessel for storage of the slurry and the filtrate, the discharge of the exhaust gas can be smaller than in a conventional apparatus which controls the liquid storage vessels separately. As the result, the hydrogen sulfide gas to be supplied for the sulfurizing reaction will be reduced in the loss and utilized at higher efficiency. Also, since the loss of the hydrogen sulfide gas is minimized, the alkali processing liquid to be used for purifying the hydrogen sulfide gas in the fourth step described previously will be reduced in the consumption.

The discharge conduit 23 delivers the slurry or the filtrate from the storage. For example, the slurry stored in the liquid storage vessel 11 is delivered to the solid/liquid separation vessel for conducting the solid/liquid separation process. Also, the filtrate stored in the liquid storage vessel 11 is delivered to a tank or the like for reuse of the hydrogen sulfide gas being dissolved therein. The liquid storage vessels $11_n$ are accompanied with their respective discharge conduits 23 through which the slurry or the filtrate is discharged from the liquid storage vessels $11_n$ individually.

(Collective Conduit)

The collective conduit 12 serves as both a flow passage of the inactive gas delivered to the liquid storage vessels 11, via the pressure control conduit 13 which will be described later and a flow passage of the exhaust gas discharged from the liquid storage vessels $11_n$ and delivered via the pressure control conduit 13 to a purifying facility.

More particularly, the collective conduit 12 is of a branched type having a series of joints $33_n$ at one end thereof aligned in parallel with the charge/discharge conduits $22_n$ of the liquid storage vessels $11_n$ so that it connects to the charge/discharge conduits $22_n$ of the liquid storage vessels $11_n$ across their respective joints $33_n$. Also, the other end of the collective conduit 12 is connected by a junction 30 to the pressure control conduit 13 which will be described later. In the liquid storage apparatus 10 of the embodiment, the inactive gas to be fed from the inactive gas feed facility via the pressure control conduit 13 to the liquid storage vessels $11_n$ is collectively conveyed by the action of the collective conduit 12. Moreover, the exhaust gas to be delivered from the liquid storage vessels $11_n$ via the pressure control conduit 13 to the purifying facility is collectively conveyed.

(Pressure Control Conduit)

The pressure control conduit 13 is connected at one end to the inactive gas feed facility for conveying the inactive gas fed from the inactive gas feed facility to the liquid storage vessels $11_n$. Also, the pressure control conduit 13 is connected at the other end to the purifying facility for conveying as the exhaust gas a portion of gaseous component at gaseous phase lodged in the liquid storage vessels $11_n$ for purification.

The pressure control conduit 13 has the junction 30 thereof for connection with the collective conduit 12 described above and is joined by the junction 30 to the collective conduit 12. Also, the pressure control conduit 13 includes a pair of pressure control valves 31, 32 located on both ends, at upstream and downstream, of the junction 30 for blocking the flow of gas. More specifically, the pressure control valves 31, 32 are located at the inactive gas feed side and the purifying facility side respectively so as to sandwich therebetween the junction 30 to the collective conduit 12. Accordingly, by adjusting the pressure control valve 31 at the inactive gas feed facility side, the feed of the inactive gas from the inactive gas feed facility to the liquid storage vessels $11_n$ can favorably be determined thus to control the pressure in the liquid storage vessels $11_n$. Also, by adjusting the pressure control valve 32 at the purifying facility side, the discharge of a portion of gaseous component at gaseous phase in the liquid storage vessels $11_n$ to the purifying facility can be determined thus to control the pressure in the liquid storage vessels $11_n$.

Moreover, the pressure control conduit 13 includes a pressure gage for measuring the pressure in the liquid storage vessels $11_n$ which constitute the liquid storage apparatus 10 of the embodiment. When the pressure gage measures the pressure in the liquid storage vessels $11_n$, its measurements are used for adjusting the paired pressure control valves 31, 32 mounted across the pressure control conduit 13 thus to precisely control the pressure at the inner side of the liquid storage vessels $11_n$. As the result, the efficiency of use of the hydrogen sulfide gas can further be improved.

The liquid storage apparatus 10 of the embodiment having the foregoing construction allows the pressure in the liquid storage vessels $11_n$ to be comprehensively controlled, while the pressure in the liquid storage vessels $11_n$ has to be controlled depending on the feed of the inactive gas fed into the liquid storage vessels $11_n$ and the discharge of the exhaust gas from the liquid storage vessels $11_n$. More particularly, with the liquid storage vessels $11_n$, the charge of the inactive gas and the discharge of the exhaust gas on each of the liquid storage vessels $11_n$ are conducted by the single charge/discharge conduit $22_n$ and, with the charge/discharge conduits $22_n$ of their respective liquid storage vessels $11_n$ collectively connected to the collective conduit 12, they are directed by the pressure control conduit 13, whereby comprehensively supervising and controlling the pressure at the inner side of the liquid storage vessels $11_n$.

Consequently, the amount of discharge of the hydrogen sulfide gas as the exhaust gas can be reduced as compared to in the conventional arrangement where, with the liquid storage vessels equipped with the charge conduits for inactive gas and the discharge conduit for exhaust gas separately, the charge of the inactive gas and the discharge of the exhaust gas are conducted corresponding to the control of pressure conducted independently at each liquid storage vessel.

More specifically, in the control of pressure conducted independently at each of the liquid storage vessels, when the pressure at the inner side of the liquid storage vessel is examined and found to be higher than a predetermined level, it can only be decreased by discharging as the exhaust gas a portion of gaseous component at gaseous phase in the liquid storage vessel. At the time, the exhaust gas contains an amount of the hydrogen sulfide gas vaporized from, for example, the slurry liquid. Accordingly, as the exhaust gas is discharged corresponding to the control of pressure at each of the liquid storage vessels, its discharge being separately implemented at an amount by each of the liquid storage vessels, the amount of the hydrogen sulfide gas contained in its total amount discharged from a group of the liquid storage vessels becomes inevitably abundant.

On the other hand, in the liquid storage apparatus 10 of the embodiment, the charge/discharge conduits $22_n$ of their respective liquid storage vessels $11_n$ for charge of the inactive gas and discharge of the exhaust gas are collectively connected so that the control of pressure is conducted corresponding to the measurements of pressure in their respective liquid storage vessels $11_n$ by the action of the pressure control conduit 13, whereby disallowing the discharge of exhaust gas from the liquid storage vessels $11_n$ to be implemented independently. Accordingly, the overall amount of the hydrogen sulfide gas contained in the exhaust gas to be totally discharged from the liquid storage apparatus 10 can be reduced. In this manner, the hydrogen sulfide gas remains mostly lodged in the liquid storage vessels $11_n$ while not wasted.

Also, since the liquid storage apparatus 10 has each of the liquid storage vessels $11_n$ equipped with the feed conduit $21_n$ for receiving the slurry and the filtrate and the discharge conduit $23_n$ for discharging the slurry and the filtrate thus to allow the feed and the discharge of the slurry and the filtrate to be carried out separately of the liquid storage vessels $11_n$, the efficiency of use of the hydrogen sulfide gas can be increased.

More specifically, the feed and the discharge of the slurry and the filtrate is carried out separately of the liquid storage vessels $11_n$, the liquid level in the liquid storage vessels $11_n$ is varied up and down from one to the other so that the pressure at the inner side of the liquid storage vessels $11_n$ becomes different from one to the other but not equal to one another. Then, in the liquid storage apparatus 10 of the embodiment, even when a difference in the inner pressure occurs between the liquid storage vessels $11_n$, the exhaust gas of the liquid storage vessels $11_n$ can be removed from one to another or dispersed by the action of the collective conduit 12.

More particularly, when the inner pressure in one, denoted $11_m$, of the liquid storage vessels $11_n$ is increased by, for example, the feed of the slurry raising the liquid level, a portion of gaseous component at gaseous phase in the liquid storage vessel nm is hence transferred via the collective conduit 12 to the other liquid storage vessel $11_o$. Since the gaseous component at gaseous phase is partially transferred from the liquid storage vessel nm to the other liquid storage vessel $11_o$ for dispersion, the amount of the exhaust gas to be delivered to the purifying facility can effectively be reduced. Moreover, the dispersion will protect the liquid storage vessels $11_n$ from being injured by an increase in the inner pressure.

In addition, the liquid storage apparatus 10 of the embodiment allows the consumption of the alkali processing liquid to be used for the purifying process can efficiently be decreased. More particularly, in the prescribed fourth step where the exhaust gas discharged from the liquid storage apparatus 10 is purified, when the amount of the hydrogen sulfide gas contained in the exhaust gas is abundant, the consumption of the alkali processing liquid will increase for conducting the purifying process. Since the liquid storage apparatus 10 of the embodiment enables to reduce the amount of the hydrogen sulfide gas to be wasted, as described above, the consumption of the alkali processing liquid for conducting the purifying process can thus be reduced with effectiveness.

Furthermore, the liquid storage apparatus 10 of the embodiment is advantageous over a conventional apparatus, which has each of the liquid storage vessels equipped with the inactive gas charge conduit and the exhaust gas discharge conduit and also with the pressure control valve for controlling the pressure separately of the liquid storage vessels, that the number of structural members including conduits and valves to be used is minimized. Accordingly, the overall cost of operation can be lowered while the efficiency of use of the hydrogen sulfide gas is improved, the consumption of the alkali processing liquid is reduced, and the efficiency of operation is increased.

<2-2. Method of Controlling the Pressure in the Liquid Storage Apparatus>

The method of controlling the pressure in the liquid storage apparatus 10 according to another embodiment of the present invention will be described in more detail. As described above, the liquid storage vessels $11_n$ in the liquid storage apparatus 10 is arranged to receive and discharge the slurry and the filtrate separately. Accordingly, the liquid level in the liquid storage vessels $11_n$ is varied up and down in response to the feed and the discharge of the slurry and the filtrate, thus causing the pressure at the inner side of the liquid storage vessels $11_n$ to change up and down.

At the time when the inner pressure of the liquid storage vessel $11_n$ is decreased by the slurry or filtrate having been discharged and the liquid level lowering, the inactive gas such as nitrogen gas is introduced into the liquid storage vessel $11_n$ for increasing the inner pressure.

In reverse, when the inner pressure of the liquid storage vessel 11, is increased by the slurry or filtrate having been fed into and the liquid level rising, a portion of gaseous component at gaseous phase in the liquid storage vessel $11_n$ is discharged as the exhaust gas for decreasing the inner pressure. Accordingly, the liquid storage vessel $11_n$ can be protected from being injured. In particular, when the inactive gas is introduced into the sulfurizing reaction vessel or the liquid storage vessel $11_n$, its inactive component may accumulate in the liquid storage vessel $11_n$ but the action of decreasing the pressure in the liquid storage vessel $11_n$ remains properly accomplished.

In the liquid storage apparatus 10 of the embodiment, the pressure control conduit 13 is connected at one end to the inactive gas feed facility for feeding the inactive gas and at the other end to the purifying facility for purifying the exhaust gas discharged from the liquid storage vessels $11_n$, thus enabling the feed of the inactive gas and the discharge of the exhaust gas.

The method of controlling the pressure in the liquid storage apparatus 10 of the embodiment is arranged to, when the pressure at the inner side of the liquid storage vessels $11_n$ drops down to lower than 0.5 kPa, active the pressure control valve 31 at the inactive gas feed facility side for introducing the inactive gas such as nitrogen gas via the pressure control conduit 13 into the liquid storage vessels $11_n$. Consequently, the pressure at the entire arrangement of the liquid storage apparatus 10 including a plurality of the liquid storage vessels $11_n$ can be increased.

On the other hand, when the pressure at the inner side of the liquid storage vessels $11_n$ rises up to higher than 1.0 kPa, the pressure control valve 32 at the purifying facility side is activated to discharge a portion of gaseous component at gaseous phase in the liquid storage vessels $11_n$ as the exhaust gas via the pressure control conduit 13. The exhaust gas discharged is then conveyed across the pressure control conduit 13 to the purifying facility. Consequently, the pressure at the entire arrangement of the liquid storage apparatus 10 including a plurality of the liquid storage vessels $11_n$ can be decreased.

As set forth above, the method of controlling the pressure in the liquid storage apparatus 10 of the embodiment involves controlling the pressure at the inner side of the liquid storage vessels $11_n$ within a range described above by interchanging the gas between the liquid storage vessels $11_n$ through the collective conduit 12 collecting the gases from the liquid storage vessels $11_n$ and by the action of the pressure control conduit 13. Consequently, the amount of discharge of the exhaust gas as well as the number of discharging times can efficiently be reduced with the use of a simple arrangement and the hydrogen sulfide gas will be avoided from being wasted as an exhaust gas.

The liquid storage apparatus 10 of the embodiment may be modified to include further a pressure detector for detecting the pressure in each of the liquid storage vessels $11_n$ from the measurement of the pressure gage mounted to the pressure control conduit 13 and a controller for controlling the action of the paired pressure control valves 31, 32 mounted to the pressure control conduit 13 in response to the pressure in each of the liquid storage vessels $11_n$ which has been detected by the pressure detector so that the action of controlling the pressure in the liquid storage apparatus 10 can be conducted in an automatic manner.

More specifically, the pressure detector examines from the measurement of the pressure gage mounted to the pressure control conduit 13 whether or not the pressure in each of the liquid storage vessels $11_n$ in the liquid storage apparatus 10 is lower than 0.5 kPa. When detecting that the pressure is lower than 0.5 kPa, the pressure detector delivers its detection signal to the controller. In response to the detection signal received, the controller activates the pressure control valve 31 at the inactive gas feed facility side to feed the inactive gas to the liquid storage vessel $11_n$ until the pressure rises up to not lower than 0.5 kPa.

On the other hand, the pressure detector examines whether or not the pressure in each of the liquid storage vessels $11_n$ is higher than 1.0 kPa. When detecting that the pressure is higher than 1.0 kPa, the pressure detector delivers its detection signal to the controller. In response to the detection signal received, the controller activates the pressure control valve 32 at the purifying facility side to discharge the exhaust gas from the liquid storage vessel $11_n$ until the pressure drops down to not higher than 1.0 kPa.

As described, the inner pressure of the liquid storage apparatus 10 is controlled by the automatic pressure control action of the controller in response to the measurement at the pressure detector, whereby the efficiency of use of the hydrogen sulfide gas can be improved easily with the use of a simple arrangement and the consumption of the alkali processing liquid can be reduced.

4. SUMMARY

As set forth above, the liquid storage apparatus 10 of the embodiment is designed for use in a sulfurization facility for sulfurizing the sulfate solution to produce a sulfide at the sulfurization step of a wet process for nickel oxide ore and featured comprising a plurality of the liquid storage vessels $11_n$ for receiving and storing the slurry produced by sulfurization of the sulfate solution or the filtrate produced from the solid/liquid separation at the second and third steps of the process, the collective conduit 12 for collectively receiving the inactive gas fed to the liquid storage vessels $11_n$ or the exhaust gas discharged from the liquid storage vessels $11_n$, and the pressure control conduit 13 for passing the inactive gas and the exhaust was thus to control the pressure at the inner side of the liquid storage vessels $11_n$. Also, while the pressure control conduit 13 is connected by the junction 30 to the collective conduit 12, it includes a pair of the pressure control valves 31, 32 located at both, front and rear, sides of the junction 30 respectively. In the liquid storage apparatus 10, a pair of the pressure control valves 31, 32 mounted to the pressure control conduit 13 are activated to control the action of feeding the inactive gas into the liquid storage vessels $11_n$ and the action of discharging the exhaust gas from the liquid storage vessels $11_n$.

Also, the pressure control method for use in the liquid storage apparatus of the embodiment involves, with the pressure control conduit 13 connected at one end to the inactive gas feed facility thus to be capable of feeding the inactive gas and at the other end to the purifying facility for purifying the exhaust gas thus to be capable of discharging the exhaust gas, activating the pressure control valve 31 at the inactive gas feed facility side to feed the inactive gas to a plurality of the liquid storage vessels $11_n$ when the pressure at the inner side of the liquid storage vessels $11_n$ drops down to lower than 0.5 kPa and activating the pressure control valve 32 at the purifying facility side to discharge a gaseous component at gaseous phase in the liquid storage vessels $11_n$ when the pressure at the inner side of the liquid storage vessels $11_n$ rises up to higher than 1.0 kPa.

According to the liquid storage apparatus 10 and the method of controlling the pressure in the same, the amount of excessive discharge of the hydrogen sulfide gas can be reduced and the efficiency of use of the hydrogen sulfide gas can be improved. Consequently, both the consumption of the hydrogen sulfide gas in the sulfurization step and the consumption of the alkali processing liquid used for purifying the exhaust gas will be minimized hence significantly reducing the overall cost of the operation.

5. EXAMPLES

Some examples of the embodiment of the present invention will be described. It is noted that the scope of the present invention is not limited to any of the examples.

Examples

The following example was carried out for measuring the efficiency of use of the hydrogen sulfide gas from the consumption of the alkali processing liquid used at the fourth step described above. When the discharge of the hydrogen sulfide gas from the liquid storage vessels is abundant, the consumption of the alkali processing liquid used for purifying the hydrogen sulfide gas will increase. It is therefore true that a decrease in the consumption of the alkali processing liquid represents the reduction of the loss of the hydrogen sulfide gas to be discharged as the exhaust gas.

Example 1

The liquid storage apparatus 10 with the sulfurization facility according to the present invention was operated for a duration of four months. The alkali processing liquid used for processing the exhaust gas was a sodium hydroxide solution.

The unit of sodium hydroxide was calculated from the following formula. In the formula, the production of nickel is a converted amount of a nickel component in the nickel/cobalt mixture sulfide produced in the fourth step.

$$\text{Unit of sodium hydroxide} = \text{the consumption } (t) \text{ of sodium hydroxide/the production } (t) \text{ of nickel}$$

In Example 1, the consumption of the sodium hydroxide solution was equal to 0.34 in the unit.

Comparative Example 1

The same operation as of Example 1 was carried out particularly with the use of a conventional liquid storage apparatus with the sulfurization facility. The measurement of the consumption of the alkali processing liquid was also identical to that of Example 1.

In Comparative Example 1, the consumption of the sodium hydroxide solution was 0.58 in the unit.

As explicitly apparent from the above results, with the liquid storage apparatus 10 according to the present invention, when the pressure in the liquid storage apparatus 10 was controlled by the method of processing the pressure according to the present invention, the consumption of the alkali processing liquid can be decreased by about 60 percents for the unit Consequently, it is proved from the above explanation that the loss of the hydrogen sulfide gas discharged from the liquid storage vessels can be decreased significantly and the efficiency of use of the hydrogen sulfide gas can thus be improved.

INDUSTRIAL APPLICABILITY

As set forth above, the liquid storage apparatus and the method of controlling the pressure in the same according to the present invention are capable of, in a wet process for nickel oxide ore employing the high pressure acid leaching process, improving the efficiency of use of the hydrogen oxide gas and thus reducing the overall cost of the operation while maintaining the recovery of nickel in a nickel/cobalt mixture sulfide at a higher rate of efficiency and favorably utilized with the wet process for nickel oxide ore. The present invention is not limited to a wet process plant for nickel oxide ore but applicable to a plant for treating a slurry containing hard grains or handling generated precipitates which are highly adhesive to the surfaces of the facilities and its industrial advantage will be high.

The invention claimed is:

1. A liquid storage apparatus for use as a sulfurization facility for sulfurizing a sulfate solution to produce a sulfide in the sulfurizing step of a wet smelting for nickel oxide ore, the apparatus comprising:
a plurality of liquid storage vessels, wherein each vessel including a feed conduit for feeding a slurry after the sulfurizing after a sulfurizing reaction and a filtrate after a solid/liquid separation, a gas charge/discharge conduit for charging an inactive gas and discharging a gaseous component at gaseous phase as an exhaust gas, and a discharge conduit for discharging the slurry or the filtrate;
a collective conduit arranged of a branched shape having a series of joints at one end of the collective conduit aligned in parallel with the gas charge/discharge conduits of respective said liquid storage vessels and connected via the joints to the gas charge/discharge conduits for collectively passing the inactive gas to be fed to the liquid storage vessels and the exhaust gas discharged from the liquid storage vessels; and a pressure control conduit for receiving at one end the inactive gas to be fed to the liquid storage vessels and releasing at an other end the exhaust gas discharged from the liquid storage vessels, wherein the pressure control conduit is connected by a junction to the one end of the collective conduit and is equipped with a pair of pressure control valves mounted on the collective conduit at both, front and rear, sides of the junction so that both the feed of the inactive gas to the liquid storage vessels and the discharge of the exhaust gas from the liquid storage vessels can be controlled by the pressure control valves.

2. The liquid storage apparatus of claim 1, wherein the pressure control conduit includes a pressure gage for measuring a pressure at an inner side of the liquid storage vessels.

3. The liquid storage apparatus of claim 1, wherein the inactive gas is a nitrogen gas.

4. A pressure control method for use with the liquid storage apparatus of claim 1, the method comprising:
  enabling of feeding the inactive gas with the one end of the pressure control conduit being connected to an inactive gas feed facility and of discharging the exhaust gas with the other end of the pressure control conduit being connected to a purifying facility for processing the exhaust gas;
  when the pressure at an inner side of the liquid storage vessels is lower than 0.5 kPa, feeding the inactive gas to the liquid storage vessels by adjusting the pressure control valve at an inactive gas feed facility side; and
  when a pressure at the inner side of the liquid storage vessels is higher than 1.0 kPa, discharging as the exhaust gas a gaseous component at gaseous phase in the liquid storage vessels by adjusting the pressure control valve at the purifying facility side.

5. The pressure control method of claim 4, wherein each of the liquid storage vessels receives the slurry or the filtrate from the feed conduit and discharges the slurry or the filtrate from the discharge conduit individually.

6. The liquid storage apparatus of claim 2, wherein the inactive gas is a nitrogen gas.

7. A pressure control method for use with the liquid storage apparatus of claim 2, the method comprising:
  enabling of feeding the inactive gas with the one end of the pressure control conduit being connected to an inactive gas feed facility and of discharging the exhaust gas with the other end of the pressure control conduit being connected to a purifying facility for processing the exhaust gas;
  when the pressure at an inner side of the liquid storage vessels is lower than 0.5 kPa, feeding the inactive gas to the liquid storage vessels by adjusting the pressure control valve at an inactive gas feed facility side; and
  when a pressure at the inner side of the liquid storage vessels is higher than 1.0 kPa, discharging as the exhaust gas a gaseous component at gaseous phase in the liquid storage vessels by adjusting the pressure control valve at the purifying facility side.

8. A pressure control method for use with the liquid storage apparatus of claim 3, the method comprising:
  enabling of feeding the inactive gas with the one end of the pressure control conduit being connected to an inactive gas feed facility and of discharging the exhaust gas with the other end of the pressure control conduit being connected to a purifying facility for processing the exhaust gas;
  when the pressure at an inner side of the liquid storage vessels is lower than 0.5 kPa, feeding the inactive gas to the liquid storage vessels by adjusting the pressure control valve at an inactive gas feed facility side; and
  when a pressure at the inner side of the liquid storage vessels is higher than 1.0 kPa, discharging as the exhaust gas a gaseous component at gaseous phase in the liquid storage vessels by adjusting the pressure control valve at a purifying facility side.

* * * * *

UNITED STATES PATENT AND TRADEMARK OFFICE
CERTIFICATE OF CORRECTION

| | | |
|---|---|---|
| PATENT NO. | : 9,139,890 B2 | Page 1 of 1 |
| APPLICATION NO. | : 13/639793 | |
| DATED | : September 22, 2015 | |
| INVENTOR(S) | : Hiroyuki Mitsui, Osamu Nakai and Moritarou Asatori | |

It is certified that error appears in the above-identified patent and that said Letters Patent is hereby corrected as shown below:

In the claims

Column 20 Claim 1, lines 53-54 "after the sulfurizing after a sulfurizing" should be --after a sulfurizing--

Signed and Sealed this
Seventeenth Day of May, 2016

Michelle K. Lee
*Director of the United States Patent and Trademark Office*